United States Patent

[11] 3,623,807

| [72] | Inventors | Fritz Gabler;<br>Leo Heraut; Karl Kropp, all of Vienna, Austria |
|---|---|---|
| [21] | Appl. No. | 856,021 |
| [22] | Filed | Sept. 8, 1969 |
| [45] | Patented | Nov. 30, 1971 |
| [73] | Assignee | C. Reichert Optische Werke A.G.<br>Vienna, Austria |

[54] APPARATUS FOR TAKING PHOTOMICROGRAPHIC PICTURES
3 Claims, 2 Drawing Figs.

[52] U.S. Cl. .................................................. 355/18,
95/12, 355/45, 355/68
[51] Int. Cl. ...................................................... G03b 27/70
[50] Field of Search ........................................... 355/18, 45,
68; 95/12

[56] References Cited
UNITED STATES PATENTS
1,934,484 11/1933 Camilli .......................... 355/68 X
3,106,129 10/1963 Frenk et al. ..................... 355/68 X Primary Examiner—Samuel S. Matthews
Assistant Examiner—Richard A. Wintercorn
Attorneys—William C. Nealon, Noble S. Williams and Robert J. Bird ABSTRACT: A microscope adapter to mount a camera, the adapter including a fully reflecting mirror and a partially reflecting mirror in its optical path. Mirrors permit instrument adjustment through auxiliary viewing apparatus. A motor connected to the fully reflecting mirror oscillates the same to provide shuttering.

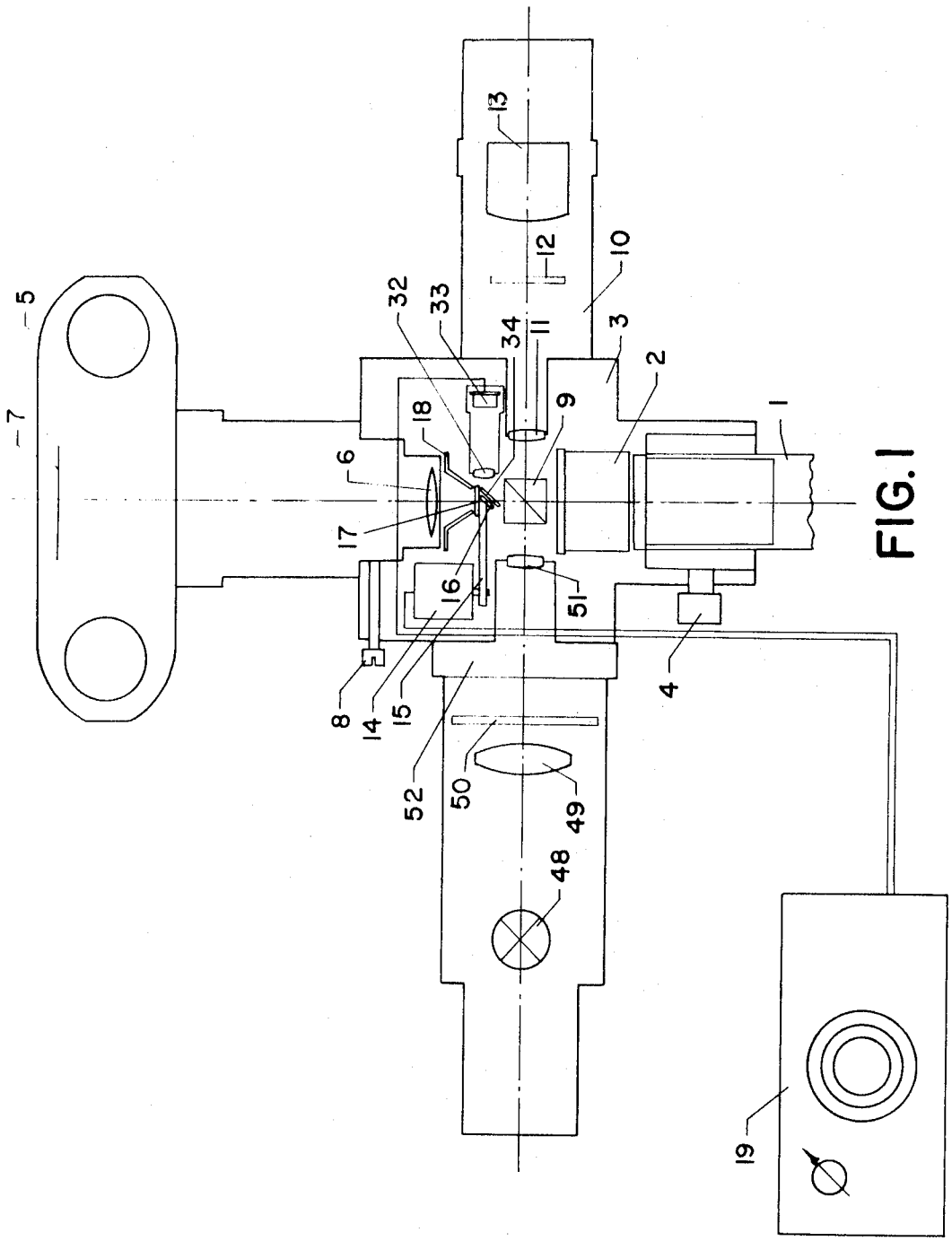

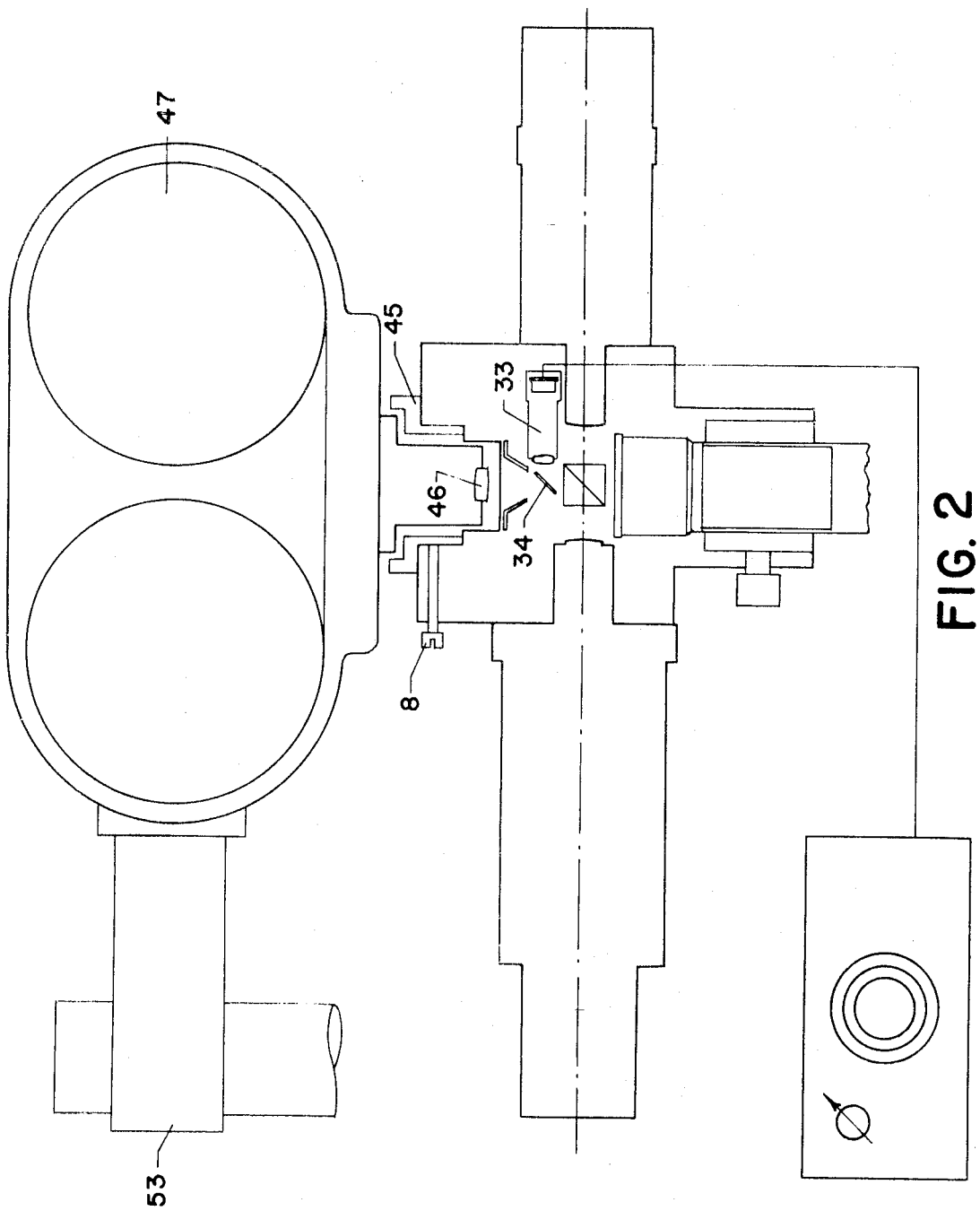

APPARATUS FOR TAKING PHOTOMICROGRAPHIC PICTURES

Photomicrographic apparatus are known which may be combined with a microscope as an attachment thereto. Most of these apparatus consist of a plurality of components, such as a body, a viewing telescope, a light-measuring device, a shutter, a camera, etc. which are assemblied in accordance with the desired use. For this reason, such apparatus is complicated in use and contains numerous potential sources of error. The mechanical between-lens shutter used in such apparatus produces excessive shocks and owing to he large magnification of the microscope results in blurred pictures. Spring suspensions may be used, but are expensive.

In many attachments, the light measurement is complicated and test pictures must be made to enable an adaptation of the light-measuring device to the operating conditions. The pictures cannot be marked or provided with numerals, arrows or similar marks. Whereas microscopic cinematography is used increasingly, it requires special adapters owing to the structural features of a motion picture camera.

Hence, the structural expenditure is considerable and much time and experience are required to get satisfactory results in the form of a good photograph.

In apparatus of a different type, the operation is simplified in that it is performed automatically to a high degree as the light measurement, the setting and releasing of the shutter, the exposure, and the film transport are carried out positively in a single sequence of operations. It is sufficient for the user to initiate the picture-taking sequence by pressing a release button. These apparatus are expensive and due to the automation have limitations. For instance, they may be restricted to miniature frame sizes of 24×36 millimeters.

It is an object of the invention to eliminate part of the drawbacks which have been set forth and to provide a photographic apparatus which with the aid of a single adapter can be combined with cameras for still pictures in various sizes as well as with motion picture cameras, and which enables the provision of an electric shutter permitting the use of short exposure times (1/250 second) and disposed at a particularly desirable point of the light path so that any shock is avoided.

The present invention relates to an apparatus for taking photomicrographic pictures with the aid of a camera focused for infinity, which apparatus is adapted to be connected to a completely assembled microscope by means of an adapter, which carries a viewing telescope and a system of mirrors which is displaceable at right angles to the optical axis and in positions defined by abutments directs different parts of the light into the viewing telescope and the camera, and said apparatus is characterized in that the system of mirrors is succeeded in the adapter by two mirrors which are arranged in close succession and are inclined from the optical axis preferably at an angle of 45°, one of said two mirrors is fully reflecting and the other is partially transmitting and stationary whereas the former is adapted to be removed from the light path and cooperates with a closely succeeding stop as a shutter which excludes light from the camera whereas when removed from the light path it permits the entire light to reach the camera. Within the scope of the invention, that shutter is suitably designed so that the fully reflecting mirror is mounted on the shaft of an electric motor, which is energized by electric pulses to rotate its shaft through an angle which is so limited that the light path is entirely closed and entirely open, respectively, in the end positions of the shaft, and the duration of the pulses and with it the exposure time is selected by a controller, which is known per se and contains resistance and capacitance elements. Having a low inertia, that arrangement enables the use of short exposure times, as may be desired. According to another feature of the invention, the duration of the pulses is selected by a switch which serves to combine the resistance and capacitance elements and which is operated by a simple control element, such as a button, lever, or the like, the fully reflecting mirror and/or the partially transmitting mirror direct the light onto a light-responsive element, which is laterally attached to the adapter and consists preferably of a photoconductor and in known manner permits of a determination of an exposure time which is required for a correct density, and the required exposure time is determined in known manner by an electrical balancing operation performed with the aid of a control element which serves also to set the exposure time. This arrangement according to the invention has the advantage that the exposure time set with the aid of the exposure meter is indicated on a scale so that any correction can be made which is deemed desirable. Because the measurement of light and the setting of the exposure time are performed with one and the same control element, errors in operation are avoided to a large extent. Another feature of the invention resides in that a unit known per se, which contains a light source, a holding and changing device and an optical system, is attached to the adapter and used to project marks, such as numerals, arrows, line patterns, through the rear side of the system of mirrors which is displaceable at right angles to the optical axis, onto the sensitized layer of the camera from replicas of such marks which are inserted into the holding and changing device. In this way, still or motion pictures may be marked in a simple manner with numbers or the like, or additional information may be introduced as reflected images.

A nonlimiting embodiment of the invention is shown in FIGS. 1–2 by way of example.

FIG. 1 shows the upper portion of the body tube 1 of a microscope and the eyepiece 2 inserted in said body tube. The microscope consists in known manner of a light source, condenser, stage and body tube. The adapter 3 is mounted on the body tube 1 and clamped in position by a knurled screw 4. A camera 5 for still pictures is attached to the adapter 3 and focused for infinity. This camera consists in the present case of a miniature camera for a frame size of 24×36 millimeters. The lens is indicated at 6 and the film plane at 7. The camera 5 is locked in position by a clamp 8. A beam splitter 9 is mounted inside the adapter 3 on a slider and extends at right angles to the plane of the drawing. In the normal or operating position, 80 percent of the light is directed toward the camera 5 and 20 percent into a viewing telescope 10, which is focused for infinity. The telescope 10 contains an objective lens 11, a field plate 12 and an eyepiece 13, which can be focused to correct any defect in vision. In this operating position, the sepcimen may be observed before and during the taking of the photograph. With very dark objects, the beam splitter 9 may be replaced by a fully reflecting mirror, which extends at right angles to the plane of the drawing and permits of an observation using 100 percent of the light.

The electric shutter and the light-measuring device are incorporated above the beam splitter 9.

The shutter consists of a motor 14, which has a shaft on which an arm 15 is secured, which carries a mirror 16 and an opaque blade 17. When the motor 14 is energized, the arm 15 performs an angular movement from its position of rest to an abutment to open a light path through a stop 18. When the energization is interrupted, a spring, not shown, returns the arm 15 to its position of rest so that the blade 17 closes the stop 18.

The exposure time which is required for taking a photograph is measured with the aid of an insertable measuring device, which consists of an auxiliary optical system 32 and a light detector consisting in the present case of a photoconductor 33. In position of rest, when the shutter is closed, the shutter mirror 16 reflects the light into he measuring device comprising the photoconductor 33. The reflected light is transmitted by a plate 34, the effect of which can be neglected in this case. The photoconductor 33 forms part of a bridge circuit. The exposure time is controlled by a timer, which is connected to the motor and is adapted to select various combinations of resistance and capacitance elements. Both parts consisting of the timer and the bridge circuit are combined in the connecting and controlling unit 19 and are controlled by a common control knob. Details of this controlling unit 19 need not be described here because they are known and apparent, e.g. from the Austrian Pat. No. 248,735.

The adapter 3 which has been described hereinbefore may also be used with motion picture cameras. In this case, see FIG. 2, a light trap 45 is inserted into the clamp 8. The objective lens 46 of the motion picture camera, e.g. for 16-mm. film, enters the light trap 45 without contacting it so that shocks are avoided. The motion picture camera itself is secured to a stand 53. The shutter is not required for motion picture cameras because in such cameras the exposure time is controlled by the setting of the number of frames per second and/or the rotary shutter. For this reason, the shutter is opened for the shooting and is not shown in FIG. 2 for the sake of clearness. Whereas the effect of the plate 34 was negligible compared to that of the fully reflecting mirror 16 in the cases illustrated in FIG. 1, it is now pointed out that said plate transmits most of the light to the film camera. The remainder mounting to 8 percent is reflected at the same time to the light-measuring device 33. This arrangement has the advantage that the exposure time can be measured and controlled during the shot too. Because motion picture cameras use short exposure times, they require powerful light sources so that the small part of the light (8 percent) which is reflected by the plate 34 for the light measurement will be sufficient for this purpose. The frame sizes and the focal lengths of the lenses of motion picture cameras are taken into account by the index marks.

Referring again to FIG 1, reticles including numbers, marks, etc. may be introduced as reflected images by means of a recording attachment. That attachment consists of the lamp 48, the lens 49, the aperture or reticle plate 50 and the objective lens 51 and is secured to the adapter 3 by the clamp 52. Transparencies or any copies carrying numerals, marks etc. may be inserted in the aperture plate 50. Corresponding images will then be formed with the aid of the beam splitter 9 at any desired point of the film in the camera for still or motion pictures which has been attached. In the telescope 10, these numerals etc. are visible at the same time so that their relation to the specimen can be adjusted.

What is claimed is:

1. A microscope adapter for taking photomicrographic pictures with the aid of a camera focused for infinity, such adapter carrying such a camera and a viewing telescope, said camera and telescope having optical access to the adapter optica path through separate apertures, said adapter having a pair of mirrors disposed in its optical path at an angle thereto, one of said mirrors being fully reflecting and one being partially reflecting, said fully reflecting mirror being operatively connected to a motor which is operable to move said mirror through an angle into and out of said optical path to act as a shutter, said fully reflecting mirror when in said optical path directing light to a light-responsive element which is operatively connected to said motor to control the exposure time of said shutter, said adapter further including a light source, a holding and changing device, and an optical system attached to the adapter and used to project images through the rear side of the system of mirrors and onto the camera film from targets which are inserted into the holding and changing device.

2. An apparatus for taking photomicrographic pictures according to claim 1, characterized in that a camera for still pictures and a camera for motion pictures are selectively attached to the adapter directly or by means of an interposed light trap.

3. A microscope adapter for taking photomicrographic pictures with the aid of a camera focused for infinity, such adapter carrying such a camera and a viewing telescope, said camera and telescope having optical access to the adapter optical path through separate apertures, said adapter having a pair of mirrors disposed in its optical path at an angle thereto, one of said mirrors being fully reflecting and one being partially reflecting, said fully reflecting mirror being operatively connected to a motor which is operable to move said mirror through an angle into and out of said optical path to act as a shutter, said fully reflecting mirror when in said optical path directing light to a light-responsive element which is operatively connected to said motor to control the exposure time of said shutter, said adapter further including an optical system for projecting selected images onto said partially reflecting mirror so that as to superimpose the same on the field which is propagated to the camera film.

* * * * *